United States Patent
Wasinger

[11] Patent Number: 6,056,885
[45] Date of Patent: May 2, 2000

[54] OZONE DISINFECTING, DECONTAMINATING AND DEODORIZING OF ANIMAL MANURE

[76] Inventor: Eric Wasinger, 7977 Garden North Dr., San Antonio, Tex. 78266-1714

[21] Appl. No.: 09/046,102

[22] Filed: Mar. 23, 1998

[51] Int. Cl.[7] .................................. C02F 1/78; C05F 3/00
[52] U.S. Cl. .......................... 210/760; 210/764; 210/173; 210/205; 210/260; 71/12; 422/28; 422/33; 422/184.1
[58] Field of Search .................................. 210/173, 198.1, 210/205, 258, 260, 672, 758, 760, 764; 422/7, 24, 28, 186.12, 33, 184.1; 71/12

[56] References Cited

U.S. PATENT DOCUMENTS

| | | |
|---|---|---|
| 3,884,804 | 5/1975 | Robinson et al. . |
| 3,945,918 | 3/1976 | Kirk . |
| 4,132,637 | 1/1979 | Key et al. . |
| 4,256,574 | 3/1981 | Bhargava . |
| 5,209,851 | 5/1993 | Hume et al. . |
| 5,290,451 | 3/1994 | Koster et al. . |
| 5,298,198 | 3/1994 | LaCrosse . |
| 5,482,528 | 1/1996 | Angell et al. . |
| 5,520,888 | 5/1996 | Berndt . |
| 5,633,163 | 5/1997 | Cameron . |
| 5,679,257 | 10/1997 | Coate et al. . |
| 5,732,891 | 3/1998 | Langenecker . |
| 5,914,163 | 6/1999 | Pescher et al. . |

*Primary Examiner*—David A. Simmons
*Assistant Examiner*—Fred Prince
*Attorney, Agent, or Firm*—John Lezdey & Assoc.

[57] ABSTRACT

This invention relates to a method and apparatus for using ozone to disinfect, decontaminate and deodorize animal manure. The invention contemplates injecting ozone gas into manure, while the manure is rotated on an auger in a sealed chamber. As a result of the invention, the manure is disinfected, decontaminated, and deodorized, while nutrients in the manure and a neutral pH are maintained.

19 Claims, 2 Drawing Sheets

OZONE DISINFECTING, DECONTAMINATING AND DEODORIZING OF ANIMAL MANURE

FIELD OF THE INVENTION

This invention relates to a method and apparatus for using ozone to disinfect, decontaminate and deodorize animal manure.

DESCRIPTION OF THE PRIOR ART

The appropriate disposal of organic waste has long been a problem, and this problem continues to grow as human and animal population densities increase. A broad variety of pathogens, such as bacteria, fungi, viruses, parasites and protozoans, survive in this organic environment. Specific microorganisms that might be present include:

Fusarium monthforme
Cladosporium (fungi species)
*Flavobacterium urborescens*
*Clastridtum sporogenes*
*Desulfovibrio desulfuricans*
*Aerobacter aerogenes*
*Bacillus subtilin*
*Pseudomonas aeruginosa*
*Pseudomonas fluorescens*
*Cladosporium resinoe*
Aeromonium
Fusarium
Alternaria
*Bacillus terminalis*
*Flavobacterium diffusm*
Achromobacter
*Pseudomonas oleovorans*
*Pseudomonas* (all species) *formicans*
*Salmonella schottmuellen*
*Salmonella typhimurium*
*Salmonella oranienburg*
*Salmonella typhosa*
*Klebsiella pneumonine*
Achromobacter sp.
*Aerobacter acrogenes*
*Aerobacter cloacae*
*Diplococcus pneumoniae*
*Escherichia coli*
*Escherichia freundii*
*Escherichia intermedium*
*Micrococcus vitreus*
*Micrococcus pyogenes* var. *albus*
*Micrococcus pyogenes* var. *aureus*
*Paracolobactrum intermediates*
*Proteus mirabilis*
*Proteus morganii*
Proteus sp.
*Proteus vulgaris*
Sarcina sp.
*Shigella madampenis*
*Streptococcus pyogenes*, alpha hemolytic
*Streptococcus pyogenes*, beta hemolytic Yeast is also present in addition to the fungi and bacteria listed above. Additionally, bacteria that might be present include heterotrophic bacteria, autotrophic bacteria, sheathed and stalked bacteria, and sulfur bacteria.

Heterotrophic bacteria includes the following:

*Bacillus megatherium* sp.
*Staphylococcus epidermitis* and var.
Pseudomonas sp.
Serratia sp.
Flavobacterium sp.
*Bacillus myocides*
*Bacillus subtilin*
*Aerobacter aerogenes*
Clostridium sp.
Coccus sp.
*Pseudomonas fluorescens*
Escherichia sp.
*T. thiooxidans*
*T. tiopartus*
*T. dentrificans*

Sulfur bacteria includes the following:

Desulfovibrio sp.
Iron bacteria
Thiobacillus sp.

Industry has long sought a method of disposing of the wastes and pathogenic organisms without infecting the environment, humans, domestic animals, or the food chain.

Great volumes of manure are produced each year which are exported or repackaged for domestic use. For example, manure could be used as fertilizer for gardens, farms, golf courses, etc., or as feed for animals. Such reuses are dangerous, however, if the manure contains significant amounts of pathogens.

The U.S. Environmental Protection Agency (EPA) has recognized the problems which disposal of pathogen infested waste can present. In response to these problems, the EPA has issued guidelines at 40 CFR § 257 concerning land disposal of waste which contains pathogens. The EPA regulations recognize three separate categories of waste in the form of sludge: unstabilized sludge, sludge exposed to a process to significantly reduce pathogens (PSRP), and sludge exposed to a process to further reduce pathogens (PFRP) "Unstabilized sludge" has not been exposed to any pathogen reducing process, is not suitable for land disposal, and can only be incinerated, buried or heat dried. Sludge which undergoes a process to significantly reduce pathogens PSRP, such as anaerobic digestion, heat treatment, lime stabilization, or air drying, can be disposed on land only if public access to the land is controlled for a period of from 12 to 18 months. Finally, sewage which undergoes a process to further reduce has PFRP has no disease related restrictions on reuse. Unfortunately, previous PFRP methods have been expensive, highly energy intensive processes such as irradiation or thermal processing which are unsuitable for transforming the sewage sludge into a readily reusable end product such as fertilizer.

Another drawback with these PFRP met hods is that they fail to destroy some parasites, such as the ascarid. The ascarid is a type of helminth worm that is a common parasite in the intestines of humans and animals. Particularly susceptible to helminthiasis (intestinal infestation with helminths) are ruminants such as sheep, cattle, goats, pigs, horses, and mules.

Ammonia has been found to be toxic to ascarides. A known method of disinfecting waste involves mixing the waste with an ammonia source. However, such method is not suitable if the waste is to be used as fertilizer or feed.

U.S. Pat. No. 4,793,927 to Meehan et al., which is incorporated herein by reference, discloses such a method for disinfecting waste with ammonia. According to Meehan et al., sewage is mixed with ammonia, a silicate and a setting agent to form an impermeable mass in which the ammonia may be used to destroy parasites in the sewage.

The problem with using ammonia is that large quantities of ammonia are required to disinfect the manure. In addition, the resulting product is in the form of a friable, clay-like mass. Another problem with the use of ammonia is that the pH in the manure is raised. As a result, if the disinfected manure were later used as fertilizer, the beneficial life forms generally found in soil, such as earthworms and vegetation, would not be able to survive in the basic environment. In addition, because of the high pH, the disinfected manure, especially chicken manure, could not later be used as animal feed. Primarily, disinfected manure with a high pH has a burning effect on animals and vegetation with which it comes it contact.

Another problem with using ammonia is the hazards in transportation and handling. Human exposure to high concentrations of ammonia can result in serious injuries.

Ozone has been used to disinfect soil. Ozone ($O_3$) is a powerful oxidizing agent. Ozone has 150% of the oxidation potential of chlorine and almost twice the oxidation potential of bromine. Unlike chlorine or bromine or halogenated compounds, ozone has a negligible deleterious effect on the environment because ozone breaks down into simple diatomic oxygen on reaction with an organic or inorganic agent. Moreover, ozone also readily self-destructs into simple diatomic oxygen due to its inherent instability especially under U.V. radiation.

Ozone breaks down large complex organic molecules into smaller molecules and eventually into $H_2O$ and $CO_2$ or very small organic molecules. Ozone kills living cells and organisms by oxidizing the cell walls. When living cells are exposed to ozone for a sufficient period of time, lysing of cell walls occurs releasing the cytoplasm of the cells and causing death of the cells.

While methods of using ozone to disinfect contaminated soil are known, they have not been applied to decontaminating manure. U.S. Pat. No. 5,624,635 to Pryor, which is herein incorporated by reference, discloses a method for killing biological life forms in soil including good bacteria by injecting an ozone-containing gas into the soil.

According to Pryor, the soil is either left in the earth or removed from the field for in-vitro treatment of ozone gas.

Ozonation is also used as a method to decontaminate soil that has been contaminated with hazardous hydrocarbons. This method is disclosed in U.S. Pat. No. 4,978,508 to Hansen et al., which is herein incorporated by reference. Hansen, et al. teaches creating a small particle slurry from the soil, and treating it with ozone gas.

According to Hansen et al., the contaminated soil is mixed with water and a suitable surfactant to form a slurry. The small particle slurry is then reacted with ozone gas. An important step the method disclosed by Hansen et al. is the continuous exposure of the ozone enriched slurry to ultra-violet light. Then, a flocculating material is added to the slurry and it is pressed into discrete segments such as blocks or brickettes of soil which is decontaminated and suitable for standard soil uses.

In contrast to known methods for disinfecting soil, disinfecting manure heretofore has involved the use of ammonia as a disinfectant which has the aforementioned drawbacks. However, there exists a need for an efficient and effective method, such as ozonation, to disinfect manure, while simultaneously preserving nutrients and maintaining substantially a neutral pH in the disinfected manure.

SUMMARY OF THE INVENTION

The disinfecting of manure heretofore has traditionally used large amounts of ammonia as a disinfectant. However, the use of ammonia is inefficient and cumbersome, as very large amounts of ammonia are required to be effective. Another drawback to the use of ammonia is that it dramatically raises the pH level of the manure so as to effect its utility on some soils and plants.

This invention relates to a method for disinfecting animal manure that uses the efficient method of ozonation. A feature of the invention consists of rotating a manure slurry in a sealed ozonation chamber, where ozone gas is bubbled through the manure slurry. The living organisms, including microorganisms, bacteria, fungi, viruses, parasites and protozoans, in the manure are thereby killed from the oxidation of their cells walls, which is an effect of exposure to ozone.

Thereafter, the disinfected manure is conveyed out of the ozonation chamber and collected for various safe and healthy uses as fertilizer and feed.

The principle object of the invention is the provision of a method for efficiently and effectively disinfecting, decontaminating and deodorizing manure, especially pig and chicken manure.

A further object of the invention is the provision of a method that will disinfect, decontaminate and deodorize manure, while at the same time preserving nutrients in the manure.

Still another object of the invention is the provision of a method that will disinfect, decontaminate and deodorize manure, while maintaining substantially a lower pH level in the manure than the use of ammonia.

Other objects and advantages of this invention will become apparent from the following description taken in connection with the accompanying drawing wherein is set forth by way of illustration and example an embodiment of this invention.

BRIEF DESCRIPTION OF THE PREFERRED EMBODIMENTS

Figure 1:
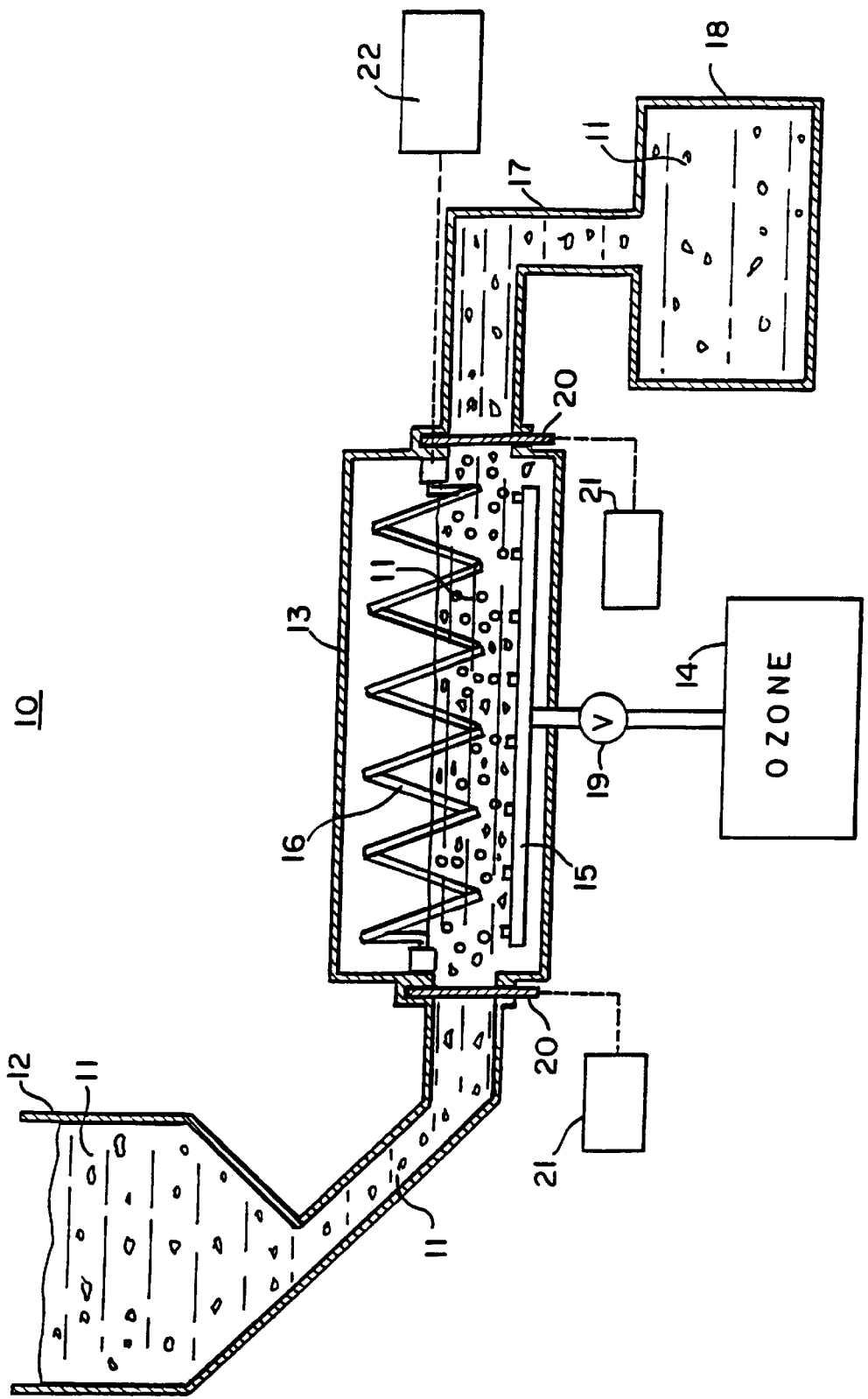
FIG. 1 is an elevational cross-sectional view of an apparatus utilizing the method of the present invention in a preferred embodiment.

Referring to FIG. 1, there is illustrated an apparatus 10 for performing the methods of the invention. The manure 11, is fed into a receptacle 12 that funnels the manure 11 to an ozonation chamber 13. The ozonation chamber 13 has an entrance opening and an exit opening (not shown), and means 19 to seal both openings. Once the manure is in the ozonation chamber 13, the entrance and the exit are sealed shut.

The ozonation chamber 13 also contains a screw auger 16, which rotates the manure, preferably in the form of a slurry, in the sealed ozonation chamber 13. While the manure 11 is being rotated by the auger 16, ozone gas is injected through a plurality of jets 15 located at regular intervals on the interior of the chamber 13.

The ozone gas is created by an ozone generator 14 located near the ozonation chamber 13. The ozone generator is any device used for supplying the ozone containing gas. The ozone generator can include an electric generator, an ozone generator with power supply, an air compressor and an air purification system. An ozone generator can also include an ozone chamber used to equalize pressure imbalances or mix or dilute the ozone containing gas with air.

The ozone generator, 14 injects the generated ozone into a conduit (not shown), which enters the ozonation chamber 13 and leads to the jets 15. The ozone dissolves in the manure slurry 11, creating ozone-enriched manure slurry 11. The ozone oxidizes the cell walls of living organisms (not shown) in the manure 11, kills the living organisms and deodorizes the manure.

The conduit may contain a valve 19 to regulate the amount of ozone that is fed into the ozonation chamber 13. When a sufficient amount of ozone has been bubbled through the manure slurry 11 in the ozonation chamber 13, the ozonation generator will cease pumping ozone into the ozonation chamber 13, and the exit opening will be opened. Thereafter, the manure slurry 11 will be conveyed by a conveyance means 17 such as a conveyor belt 17 to a collection receptacle 18 where the disinfected, decontaminated and deodorized manure may be collected and dried.

In one embodiment, the screw auger 16 may be connected to a power device 22 that will cause the auger 16 to rotate, and regulate its speed.

In another embodiment of the invention, a computer (not shown) may be connected to the ozonation chamber 13 that will monitor and regulate the amount of ozone gas in the chamber 13, the duration during which the manure is subjected to the ozone gas, and the speed and duration of the rotation of the screw auger 16.

Also, the ozone enriched water from the slurry may be removed and recirculated to the chamber so as to have a quickly enriched slurry or used to irrigate the land.

In yet another embodiment of the invention, the ozone gas may be vented by means of a vent pipe (not shown) to a deozonation chamber (not shown) containing a catalyst to destroy any unconsumed ozone, before releasing it into the atmosphere.

In another embodiment, prior to entering the ozonation chamber 13, the manure slurry 11 can be placed in an apparatus (not shown) for grinding or a separating that renders the manure 11 relatively uniformly homogenous. After ozonation, the manure is optionally transferred to a dryer (not shown) and dried until the total moisture content is less than or substantially equal to 15 percent.

Alternatively, the manure could be dried, or could be allowed to dry to substantially less than or equal to 20% moisture by weight.

In still another embodiment, the manure slurry could be flocculated after reaction with the ozone, and then the flocculated slurry could be formed into discrete pellet or bricks.

A flocculating material selected from a group consisting of lime, magnesium oxide and diatamaceous earth is controllably added to the slurry while it is in the ozonation chamber 13. Also added to the slurry is a polymer material selected from a group consisting of anionic, cationic and nonionic polymers. The amounts of flocculating material and polymer to be added to the slurry depends upon the nature of the manure being processed and the amount of water present in the slurry. After the disinfected, decontaminated, and deodorized manure is conveyed out of the ozonation chamber 13, the flocculated slurry thus-formed is conveyed to a belt-filter press (not shown) where it is pressed into discrete pellets or bricks.

Another embodiment exposes the slurry to ultraviolet light while it is being treated with ozone gas in the ozonation chamber 13. Alternatively, the slurry would be exposed to ultraviolet light after ozone treatment. The ultraviolet light is radiated from a light fixture (not shown) located on the top interior wall of the ozonation chamber 13. Optionally, the light fixture would have a means to turn on and off the ultraviolet light from the outside of the ozonation chamber 13.

Figure 2:
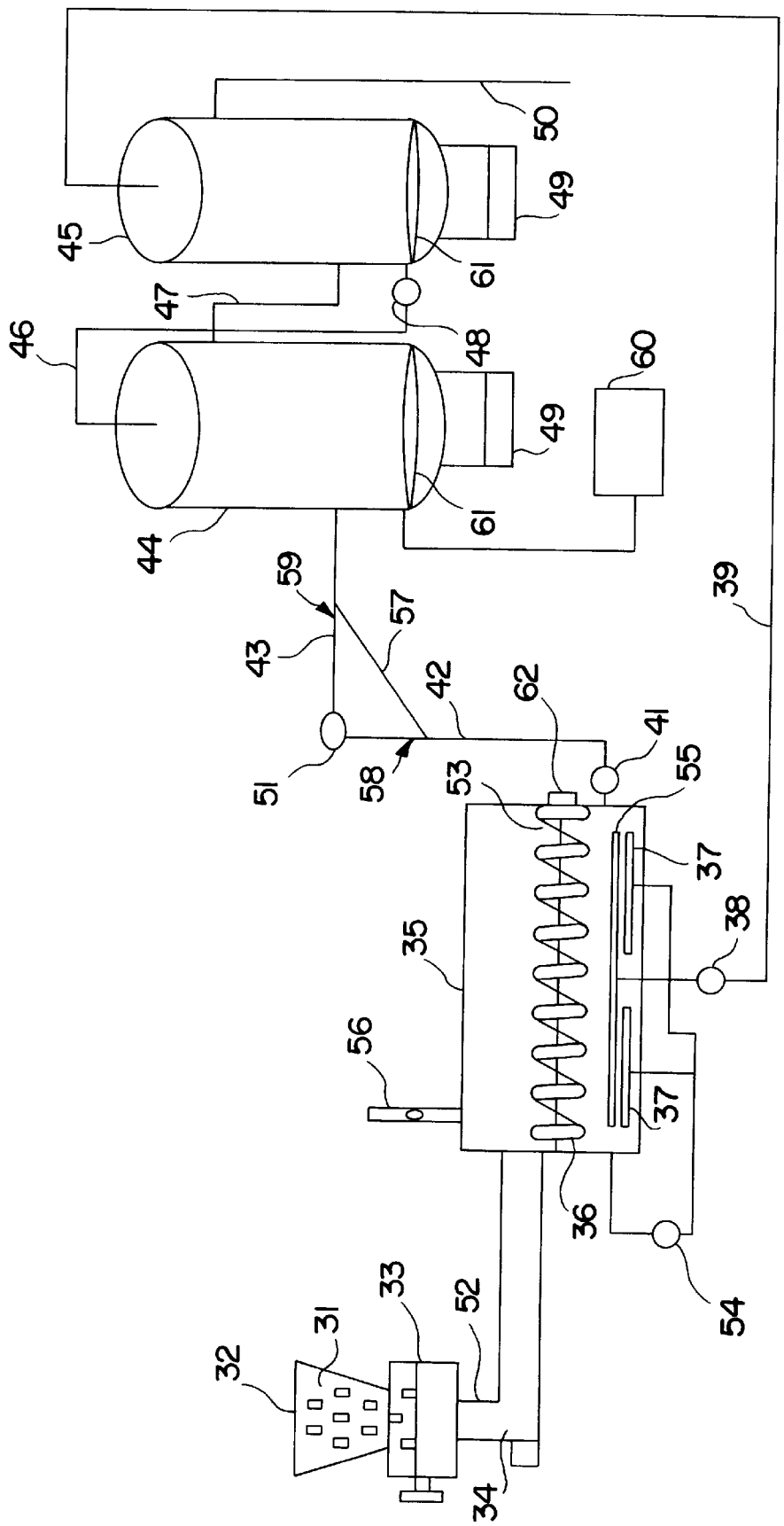
FIG. 2 is an elevational cross-sectional view of the apparatus in another embodiment.

Referring to FIG. 2, there is illustrated an apparatus 30 for performing the methods of the invention. The manure 31 is fed into a hopper 32 that funnels the manure into a shredder 33, where any large particles of manure are broken down into smaller particles 52. The smaller manure particles are moved to the slurry tank 35 by means of an auger 34.

The manure slurry 53 is continuously agitated by an auger type agitation device 36 and a recirculation pump system 54, which includes two bars 37 with a plurality of water jets, which keeps the manure slurry from settling to the bottom of the slurry tank. The slurry tank contains a plurality of jets 55 for injecting ozone off-gas collected from contact tank 45 by means of a gas pump 38.

The excess ozone off-gas travels from contact tank 45 by means of an ozone resistant pipe 39 to the slurry tank. The slurry tank 35 also has a vent 56 by which any unused ozone gas can be transferred to an ozone destruction unit (not shown). This vent allows any natural gases to be blended with the excess ozone off-gas (not shown) for odor control.

The pretreated manure slurry 53 is removed from the slurry tank 35 by means of a slurry pump 41 and travels through an ozone resistant pipe 42 to a specialized diaphragm pump 51 capable of putting the manure slurry under sufficient vacuums and pressures to aid in the breaking down of cell walls of living organisms (not shown) prior to ozonation. The specialized pump was designed by Petroleum Specialist Lab, San Antonio, Tex., and manufactured by Gates Enterprises, San Antonio, Tex.

The manure slurry 53 is then pumped through an ozone resistant pipe 43 into the contact tank 44. In the case of light contamination, the manure slurry 53 may be pumped from the slurry tank 35 directly into the contact tank 44 by closing valves 58 and 59, thereby utilizing ozone resistant bypass pipe 57.

Once the manure slurry 53 reaches a contact tank depth sufficient to activate the recirculation pump 49 and ozone generator 60, ozone gas is discharged through a ring diffuser 61, located at or near bottom of the contact tank 44, allowing the ozone gas to enter the contact tank 44. The ozone gas dissolves in the manure slurry, creating ozone enriched manure slurry. The ozone oxidizes the cell walls of living organisms in the manure, kills the living organisms and deodorizes, disinfects and decontaminates the manure.

When the manure slurry 53 reaches a certain height in the contact tank 44 it is gravity fed into the contact tank by means of an ozone resistant pipe 47. A slurry pump (not shown) may also be employed to move the manure slurry.

Excess ozone gas in contact tank 44 is removed from the top portion of the tank by a gas pump 48 through an ozone resistant pipe 46 into the ring diffuser 61 located at or near the bottom of the next contact tank 45. Again the ozone gas dissolves in the manure slurry, creating further ozone enriched manure slurry, killing additional living organisms and continuing to deodorize, disinfect and decontaminate the manure.

When the ozone processed manure slurry 53 reaches a certain height in the contact tank 45 it is gravity fed into the collection receptacle (not shown) where the disinfected, decontaminated and deodorized manure may be collected. Additionally, the excess water in the slurry may be drawn out of contact tank 45 through a pipe 50 into a receptacle (not shown) or an irrigation system (not shown).

In one embodiment, the auger type mixer 36 may be connected to a power device 62 that will cause the auger 36 to rotate, and regulate its speed.

In another embodiment of the invention, a computer (not shown) may be connected to the ozonation contact tanks 44 and 45 that will monitor and regulate the amount of ozone gas in the contact tanks 44 and 45, the duration during which the manure is subjected to the ozone gas, the flow rate of the gas and the concentration of the ozone gas.

Also the ozone enriched water from the final contact tank 45 may be removed and recirculated to the slurry tank 35 so as to have a quickly enriched slurry.

The ozone gas is created by an ozone generator located near the contact tanks. The ozone generator may be of a type which is manufactured by Ozone Research and Equipment Co. of Phoenix, Ariz. The ozone generating system can include the ozone generator, power supply, an air compressor, an air drying and purification system. An ozone system can also include a water cooling and recycle system. In addition, an ozone system can include an ozone manifold used to equalize pressure and regulate flow of the ozone gas.

Contact tanks 44 and 45 are equipped with recirculation pumps 49 to maintain agitation of the manure slurry.

Ultraviolet radiation is destructive of ozone and causes a reaction similar to a catalytic reaction. Exposure of the slurry to ultraviolet light enhances the speed and effect of ozone destruction of living organisms. The duration of the ultraviolet exposure is from one to eight hours.

Preferably, the wavelength of the ultraviolet light is approximately 185 nanometers.

In one embodiment, one ultraviolet light source each (not shown) would be installed in the inside upper quadrant of the contact tank 44 and of the contact tank 45. The ultraviolet radiation from these sources would be directed on the ozone gas and slurry mixture. In addition, an ultraviolet light source (not shown) would be installed near the ring diffuser 61 in the contact tank 44 and on the interior of ozone resistant pipe 46 in the portion between the gas pump 48 and the ring diffuser 61. The ultraviolet radiation from these sources would be directed on the ozone gas before it interacts with the slurry.

Although any kind of animal manure can be disinfected, decontaminated and deodorized by the invention, using Suidae manure, preferably pig manure, is particularly advantageous because before it is disinfected, decontaminated and deodorized it is known to contain bacteria, viruses and other pathogens. In addition, using Galliformes manure, particularly chicken manure, is particularly advantageous because after it is disinfected, decontaminated and deodorized, it can be used as animal feed.

What is claimed is:

1. A process for disinfecting, decontaminating, and deodorizing manure containing living organisms for use as fertilizer, comprising the steps of:
   forming a slurry with manure;
   maintaining a substantially neutral pH;
   providing an apparatus having a chamber and a conveyor;
   continuously moving said manure through said chamber with said conveyor;
   generating a gas comprising ozone;
   treating said manure slurry in a sealed chamber with said gas to form ozone enriched manure and in an amount to disinfect, decontaminate and deodorize said manure, adding flocculating material and then forming discrete pellets or bricks.

2. The process of claim 1 wherein said living organisms are killed in said ozone enriched manure by oxidizing a portion of the cell walls of said organisms.

3. The process of claim 1 wherein said manure is from mammals of the family Suidae.

4. The process of claim 1 wherein said manure is from fowls of the order Galliformes.

5. The process of claim 1 wherein said manure is dried to substantially less than or equal to 20% moisture by weight prior to said treatment step.

6. The process of claim 1 wherein said manure is allowed to dry to substantially less than or equal to 20% moisture by weight prior to said treatment step.

7. The process of claim 1, further comprising the step of exposing said manure to ultraviolet light during said treatment step.

8. The process of claim 1, further comprising the step of exposing said manure to ultraviolet light after said treatment step.

9. The process of claim 1, further comprising the step of drying said manure after treatment with the ozone.

10. An apparatus for disinfecting, decontaminating, and deodorizing manure containing living organisms, said apparatus comprising:
    a shredding means for breaking down manure into small particles;
    a slurry tank for agitating the manure into a slurry;
    a contact tank containing an ozone injection means, and a means to transport said slurry from said slurry tank to said contact tank;
    means for generating vacuums and pressures associated with said transport means to break down cell walls;
    an ozone generating means, said means generating ozone that is transported by said ozone injection means into said contact tank wherein said ozone interacts with said slurry, creating an ozone enriched slurry; and
    a collection receptacle having a transportation means connected to said contact tank whereby said ozone enriched slurry is transported from said contact tank to said collection receptacle.

11. The apparatus of claim 10, further comprising a means for collecting unused ozone gas in said contact tank, and a means for transporting said unused ozone gas into said slurry tank.

12. The apparatus of claim 10, containing a first and a second contact tank, each said tank having an ozone injection means which transports ozone into said tank, whereby said ozone interacts with said slurry creating an ozone enriched slurry.

13. The apparatus of claim 12, wherein the ozone injection means is a ring diffuser.

14. The apparatus of claim 12, wherein said first contact tank contains an ozone resistant pipe located on the upper side wall of said tank, said pipe being connected to the lower side wall of said second contact tank, whereby said slurry is gravity fed from said first contact tank to said second contact tank through said pipe.

15. The apparatus of claim 14, further comprising a second ozone resistant pipe, said pipe being connected to the top of the first contact tank and the ozone injection means of the second contact tank; said pipe being connected to a gas pump, whereby any unused ozone gas from the first contact tank is transported to the second contact tank.

16. The apparatus of claim 10, further comprising a means for collecting ozone enriched water from said slurry in said contact tank, and a means for transporting said water into said slurry tank.

17. The apparatus of claim 10, further comprising a recirculation pump in said contact tank to agitate said slurry.

18. The apparatus of claim 10, further comprising a plurality of ultraviolet light sources directed both at the ozone gas slurry mixture and the ozone gas before it interacts with the slurry.

19. The process of claim 1 including the steps of creating a vacuum and a pressure to disrupt the cell walls of living organisms.

* * * * *